Figure 1:
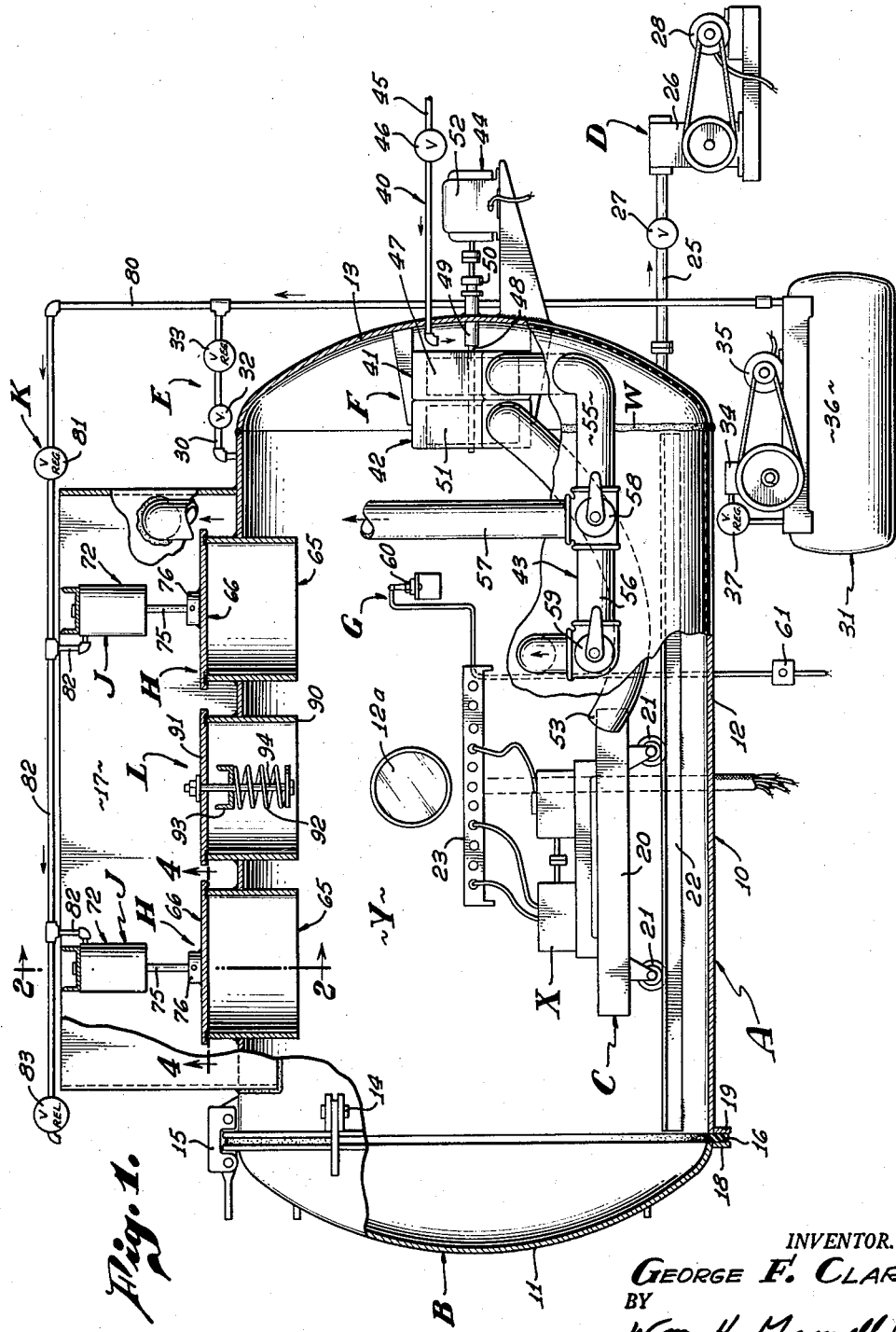

Dec. 22, 1959    G. F. CLARK    2,917,927
PRESSURE RELIEVED EXPLOSION CHAMBER
Filed April 22, 1954    2 Sheets-Sheet 1

INVENTOR.
GEORGE F. CLARK,
BY
Wm. H. Maxwell Jr.
AGENT.

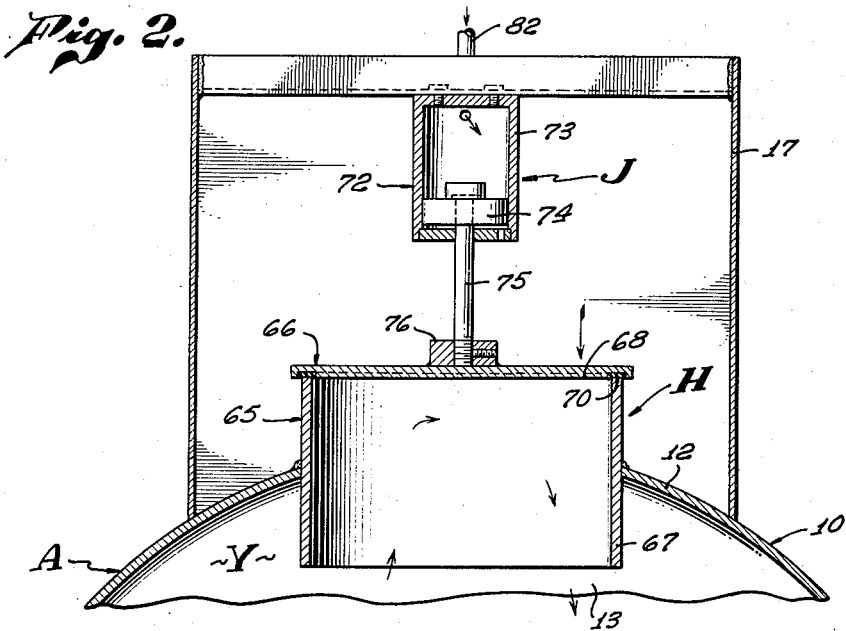
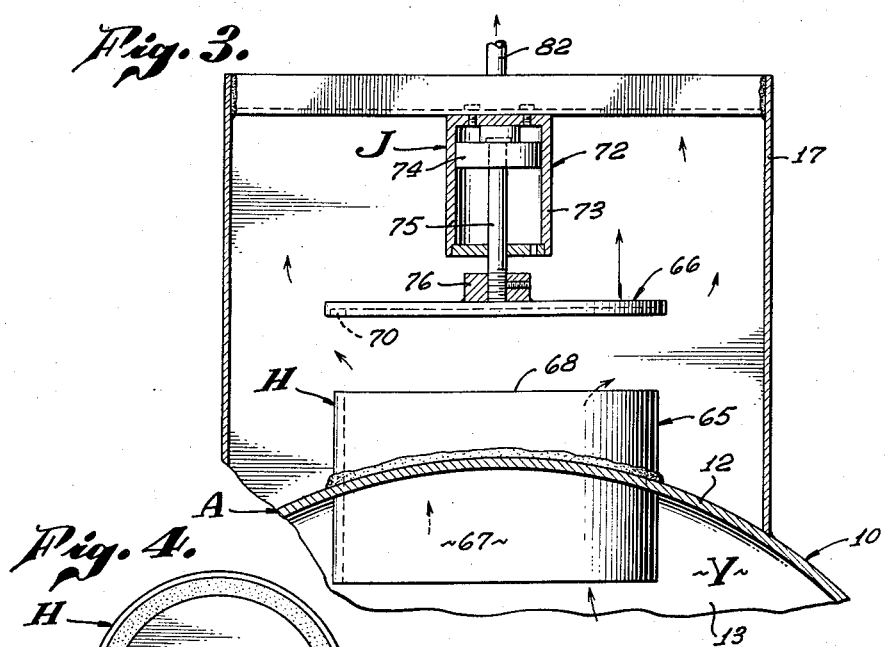
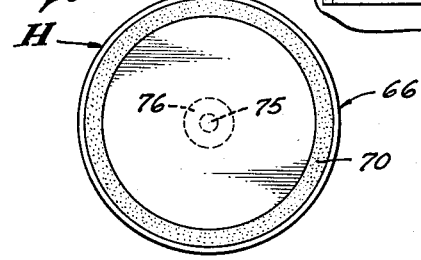

_United States Patent Office_

2,917,927
Patented Dec. 22, 1959

2,917,927

PRESSURE RELIEVED EXPLOSION CHAMBER

George F. Clark, Los Angeles, Calif., assignor to Hieatt Engineering Company, Burbank, Calif., a corporation of California Application April 22, 1954, Serial No. 425,016

8 Claims. (Cl. 73—432)

This invention is concerned with a pressure relieved explosion chamber useful for environmental testing of devices such as explosion-proof machines, and such that predetermined internal pressure conditions can be established within the chamber and maintained under various external pressure conditions. For instance, super-atmospheric or sub-atmospheric pressure may be maintained within the chamber regardless of the pressure which exists at the outside of the chamber.

It is desirable in many situations to test or maintain explosion-proof mechanical devices, or the like, at given predetermined pressures during their operation in order to establish the fact that they are explosion-proof. Such chambers are particularly useful for testing incidental to the perfection or development of aeronautical devices and equipment, and must be operable at various altitudes or atmospheric pressures. For instance, the chamber may be operated at a place which is at sea level, or it may be operated at a place of any lower or higher altitude.

A general object of the invention is to provide a valve controlled chamber of the general character referred to, which is of heavy or substantial construction in order to withstand the internal and external pressures to which it may be subjected during operation, while at the same time the structure is compact and simple in construction and highly efficient in operation.

It is another object of the invention to provide a valve for an explosion chamber of the character described which is operable under various external pressure conditions to immediately relieve explosive pressures developed within the chamber.

A further object of the invention is to provide efficient means for directing or charging mixtures or gases into and exhausting them from an explosion testing chamber of the character referred to.

It is also an object of the present invention to provide an effective means for evenly distributing and circulating an explosive mixture within a closed pressurized container of the character referred to.

The structure of the present invention involves a body in the form of a cylindrical case that dependably maintains itself in a desired form under all operating conditions. The body is open at one end, and a closure is provided at the open end of the body. The end and closure are preferably dome-shaped and arranged with their concave sides inward, the closure being joined to the main section of the body by one or more hinges and being held closed by a suitable lock means. The several parts of the body, as just referred to, are preferably formed of steel plates of substantial weight or thickness to give the structure the desired strength against being crushed or collapsed when the chamber within the structure is exhausted, and from bursting when the explosive pressures are created within the body.

A test support is provided in connection with the body for carrying the device to be tested, and such support involves a base which is movably carried on rollers so that it may be operated to and from the interior of the body on tracks which are provided along the lower portion of the body. A means is provided for exhausting air from the interior of the body, which means includes an exhaust pipe or line connected to a suitable suction pump. The line is under control of a valve. A means is provided for pressurizing the interior of the body, which means includes a pressure line connected to a pressure supply line, a shut-off valve in the pressure line and an adjustable pressure regulator.

Air conditioning means is provided by the present invention and includes a blower adapted to deliver air to a ducting system which is adapted to direct the mixture delivered by the blower into the interior of the body, or alternately to the exterior of the body where it is exhausted from the chamber. The air conditioning means also involves a circulating blower which receives air within the body and is adapted to deliver the air through a flexible duct, as may be required under special conditions. An ignition means is provided for exploding the mixture within the chamber and includes a suitable spark or glow plug under control of a switch at the exterior of the chamber.

The valve which is provided by the present invention is quick acting, and is adapted to immediately respond to pressure within the body of the chamber, whereupon the valve is immediately released or opened. The valve is preferably large and of such capacity as to handle large quantities of gases which are likely to escape from the chamber. The valve involves a cylindrical seat element and a simple disc-shaped valve element which is movable relative to the seat. An operating means is provided for the valve and is operable to hold the valve closed against the pressure within the body. The operating means involves a cylinder and piston mechanism which is carried by the body of the chamber, and which is connected to the movable valve element. A pressure line is connected with the cylinder above the piston so that pressure is exerted downwardly against the valve element forcing the element into engagement with the seat.

A valve control means is provided for applying pressure to the operating means above referred to and involves a pressure line under control of an adjustable pressure regulator. The pressure regulator controls the pressure applied to the cylinder and piston mechanism so that the valve element is held with the desired force against the seat. The control means also includes a pressure release valve which is adjustable and is adapted to relieve pressure from the cylinder and piston mechanism when the pressure therein reaches a predetermined limit. A safety valve is provided for releasing extreme pressures from the chamber under extraordinary circumstances.

The various objects and features of my invention will be fully understood from the following detailed description of a typical preferred form and application of my invention, throughout which description reference is made to the accompanying drawings, in which:

Fig. 1 is a sectional view taken longitudinally and vertically through the chamber that I have provided and showing portions of my invention diagrammatically. Fig. 2 is an enlarged detailed sectional view of the valve that I have provided taken as indicated by line 2—2 on Fig. 1. Fig. 3 is a view similar to Fig. 2 showing the valve in a different position, and Fig. 4 is an enlarged view of the valve element taken as indicated by line 4—4 on Fig. 1.

The structure provided by the present invention involves, generally, a body A which forms a chamber Y, a closure B closing one end of the body, a test support C within the body, an exhaust means D adapted to establish sub-atmospheric pressure within the body, a pressure means E adapted to apply super-atmospheric pressures to the body, an air conditioning means F for charging into, exhausting from, and circulating air mixtures within the body, an ignition means G for igniting mixtures within the body, a valve means H for dumping gases from the body, an operating means J in connection with the valve means H, a control means K for the operating means, and a safety valve L for the body.

The body A, as provided by the present invention, is in the form of a container or chest, and it is provided as the element or structure serving to withstand internal and external pressures. In its preferred form the body involves, generally, a cylindrical case 10 and a closure 11. In the case illustrated the body has an elongate cylindrical main section 12 and an inner end 13 closing the inner end of the main section 12. The inner end 13 is preferably dome-shaped and is integrally connected or joined to section 12 as by welding W, or the like. The end 13 is joined to section 12 so that the concave side of the end 13 is inward, as clearly shown in Fig. 1 of the drawings. The closure 11 is preferably a dome-shaped part or unit joined to the outer end portion of the main section 12 by one or more hinges 14 and releasable latches or fasteners 15. The closure 11 is arranged with its concave side inward as shown in Fig. 1, and it is preferably made to correspond in size or diameter with the outer end of the main section 12. A suitable transparent inspection plate 12$^a$ is provided so that the interior of the body is visible. A sealing means is provided to establish and maintain an air-tight seal between the closure 11 and the case 12 of the body. In the preferred form of the invention the sealing means involves an annular packing ring 16 arranged to occur between the flanges 18 and 19. A shield 17 projects upwardly from the top of the body A and is characterized by a simple rectangular box-like element open at the top. The shield 17 encloses the valves, H and L.

The test support C is located within the body A and involves a base 20 movably carried on rollers 21 engaged on tracks 22. An electro-mechanical device or mechanism in the form of a motor generator X is shown mounted on the test support C, which device is typical of the type of mechanism adapted to be tested within the explosion chamber which I have provided. An electrical test panel 23 is provided and located at the side of the body A for carrying the electrical circuits necessary for operation of the device to be tested, such as the motor generator X. In cases where the device to be tested is bulky and of considerable weight, it is a simple matter to mount the unit on the base 20 and then move the base 20 and device to be tested into position within the body A.

The exhaust means D, provided for removing gases from the interior of the case 12, involves a pressure connection 25 between the case 12 and a suction pump 26. The connection 25 may be a suitable pipe connection and it may carry a control valve 27 adapted to be opened or closed as circumstances require. The pump 26 may be any suitable suction or evacuating pump and is driven by a suitable motor 28, such as an electric motor, or the like. It will be readily understood how the pump may be driven by the motor to evacuate the interior of the case 12 when the valve 27 is open.

The pressure means E, provided for introducing air into the interior of the case, involves a pressure line 30 extending between the case 12 and a pressure supply 31. A control valve 32 and a pressure regulating valve 33 are carried in the line 30 to control the air flow into the case 12. The valve 32 may be a simple shut-off valve and the pressure regulating valve 33 may be adjustable to deliver air at a given constant pressure. The supply 31 may be any suitable air compressing apparatus, and, as shown in the drawings, the supply 31 involves a pressure pump 34 driven by a suitable motor 35, such as an electric motor or the like, and a reservoir 36 for storing the air compressed by the pump 34. The supply 31 may be controlled by a suitable regulating valve 37 which is adapted to stop the operation of the pump 34 when the desired pressure is reached within the reservoir 36. By adjusting the valve 33 to the pressure which is desired within the case 12, and by opening the valve 32, the desired pressure is supplied from the reservoir 36 to the interior of the case 12.

The air conditioning means F, provided by the present invention, is adapted to evenly distribute a uniform explosive air mixture throughout the interior of the body A and involves, generally, a fuel supply 40, an air delivery fan 41, an air circulating fan 42, distribution ducting 43, and a fan drive 44. The fuel supply 40 is characterized by a pipe line 45 under control of a shut-off valve 46, the line 45 being connected with a source of suitable combustible gas.

The delivery fan 41 is characterized by a barrel-type fan element 47 rotatably carried on a shaft 48 entering the end 13 of the body A. The shaft 48 is carried in a bearing 49 supported by the end 13 of the body and enters the body A through a suitable gland or packing 50.

The air circulating fan 42 is characterized by a barrel-type blower element 51 located adjacent to and concentric with the element 47. The element 51 is also carried on the shaft 48 and is inward of the element 47 as shown in Fig. 1 of the drawings. The drive 44 may be any suitable motor 52, such as an electric motor or the like. As shown in the drawings, the elements 47 and 51 are carried and driven together as a unit and are preferably barrel-type fan units which receive air axially at the center thereof and deliver air tangentially from the periphery thereof.

The distribution ducting 43 receives the air mixture delivered by the blower element 47 while the blower element 51 delivers air directly into the interior of the body A to create circulation within the body. A flexible duct 53 may be provided to receive air delivered by the element 51 and to distribute it within the chamber in the manner desired. The distribution ducting involves a receiving duct 55 joined to and receiving air delivered by the blower element 47, a charging duct 56 extending from the duct 55 and delivering air into the body A, and a discharging duct 57 extending from the duct 55 and delivering air into the atmosphere surrounding the body A, preferably within the shield 17 as shown in the drawings.

A suitable valve 58 is provided at the end of the duct 55 and is adapted to direct air into the duct 56 when in one position, and into the duct 57 when in the other position. A suitable valve 59 is carried in the duct 56 and is a simple shut-off valve for preventing flow of air through the duct 56 into the chamber Y. It will be readily understood how the valves may be manipulated to control the air flow either to circulate air into the chamber, or to exhaust it therefrom. By directing the air into the duct 56 through operation of the valve 58, the air distribution ducting 43 is closed to the external atmosphere.

The ignition means G, provided by the present invention, is used for exploding the mixture carried within the body A. After the environmental testing of a device within the body A, and where the device is operated successfully and in such a manner as to leave the explosive mixture within the body, it becomes necessary to test the mixture within the body in order to determine whether or not the mixture was, in fact, explosive. Therefore, after the testing operation has been completed the ignition means is operated in order to prove that the mixture in the body was explosive during operation of the device being tested. The ignition means provided involves a suitable ignition or glow plug 60 in an electrical circuit under control of a suitable switch 61. When the switch 61 is closed the plug 60 operates to ignite the mixture within the chamber Y of the case 12.

The valve of the present invention is provided for quickly and immediately releasing pressure which is developed within the body A. As shown in the drawings, there may be one or more valve units H, and each involves, generally, a seat 65 and a valve element 66 movable relative to the seat. The valve H is preferably carried on a vertical axis in which case the valve seat is horizontally disposed and the valve element is moved vertically relative to the seat as the valve is opened. The seat 65 is preferably a cylindrical part carried at the top of the case 12, enters the case, and is characterized by an inner cylindrical wall 67 which forms an opening in the case 12 of the body. The cylindrical seat 65 extends from the interior of the body A and projects upwardly and terminates at the exterior of the body in a flat horizontally disposed face 68. The valve element 66 is preferably a simple flat disc-shaped part and is engageable with the seat 65 to close off the interior of the body A from the atmosphere at the exterior of the body. The valve element 66 is somewhat larger in diameter than the seat part 65 and is provided with a seal 70 of rubber, or the like, engageable with the face 68. When the valve element 66 is engaged with the face 68 of the seat 65 the seal 70 prevents leakage between the parts.

The valve operating means J is provided for holding the valve element 66 in pressure engagement with the valve seat 65 and involves a reciprocating or cylinder and piston mechanism 72 which is coupled to and carries the valve element 66. The cylinder and piston mechanism is carried on a vertical axis concentric with the seat 65 and valve 66, and has a cylinder 73 which slidably carries a piston 74. A piston rod 75 projects downwardly from the piston 74 and is engaged with a boss 76 on the upper side of the valve element 66. It will be readily understood how the areas of the valve element 66 and of the piston part 74 are related so that a differential pressure is applied to the cylinder and piston mechanism 72 in order to hold the valve closed against the pressure within the body A.

The valve control means is provided for applying a constant pressure to the valve operating means and for releasing said pressure when an explosion occurs within the body A. The means K involves a pressure line 80 extending from the pressure means E hereinabove described, a pressure regulating valve 81 in the line 80, pressure lines 82 receiving pressure from the line 80 and regulating valve 81 and delivering it to the cylinder and piston mechanism 72 of each valve operating means, and a pressure release valve 83 in communication with the lines 82. The pressure regulating valve 81 may be any suitably adjustable regulating valve, and the pressure release valve 83 may be any suitably adjustable pressure release valve.

In order to operate the valve in the desired manner, it is merely necessary to adjust or set the regulating valve 81 for a pressure somewhat in excess of the pressure which prevails within the body A, while the pressure release valve 83 is adjusted or set for a pressure somewhat in excess of the pressure delivered by the regulating valve 81 to the lines 82. When an explosion occurs within the body A immediate and extreme pressure is exerted upon the cylinder and piston mechanism 72 forcing the piston 74 upwardly and compressing the air above the piston and in the lines 82, whereupon the release valve 83 operates to allow the excess pressure to escape so that valve elements 66 are released to move upwardly. After the explosion has expelled the excess gas from within the body A the release valve 83 will close and allow the pressure delivered by the regulating valve 81 to force the valve H back into a closed position.

The safety valve L, which I have provided, is for emergency conditions and is set for the maximum pressure to which the structure may be subjected, and involves a seat 90 and a valve element 91. The seat and valve 90 and 91, respectively, may be constructed in the same manner as the seat and valve 65 and 66, respectively, of the valve H above described. The safety valve L is operated into a closed position by means of a suitable compression spring 92 engaged against a stop 93 carried within the seat 90 and operating the valve 91 through a rod 94.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. In combination, a chest-like case having a chamber and a closure therefor, a valve in communication with the case and having a seat faced away from the chamber and a movable valve element engageable with the seat, an operating means for the movable valve element including a reciprocating mechanism to shift the valve element to engage on the seat and to be unseated upon an excessive pressure within the case, and a control means for the operating means including a pressure line supplying fluid pressure to the said mechanism to hold the valve element engaged on the seat below said excessive pressure and an adjustable pressure regulating valve in said line maintaining said fluid pressure to hold the valve element engaged on the seat below said excessive pressure.

2. In combination, a chest-like case having a closure, a valve in communication with the case and having a seat and a movable valve element engageable with the seat, an operating means for the movable valve element including a reciprocating mechanism to shift the valve element to engage on the seat and to be unseated upon an excessive pressure within the case, and a control means for the operating means including a pressure line supplying fluid pressure to the said mechanism to hold the valve element engaged on the seat below said excessive pressure and an adjustable pressure regulating valve in said line maintaining said fluid pressure and a relief line from the said mechanism and a pressure release valve in said relief line, said case normally containing a given pressure therein, and said release valve releasing pressure from the said mechanism at a higher pressure than the pressure maintained by the regulating valve when excessive pressure occurs within the case.

3. In combination, a chest-like case having a closure, a valve in communication with the case and having a seat and a movable valve element engageable with the seat, an operating means for the movable valve element including a reciprocating mechanism to shift the valve element to engage on the seat and to be unseated upon an excessive pressure within the case, and a control means for the operating means including a pressure line supplying fluid pressure to the said mechanism to hold the valve element engaged on the seat below said excessive pressure and a pressure regulating valve in said line, said regulating valve normally maintaining a pressure in the said mechanism higher than the pressure in the case.

4. In combination, a chest-like case having a closure, a valve in communication with the case and having a seat and a movable valve element engageable with the seat, an operating means for the movable valve element including a reciprocating mechanism to shift the valve element to engage on the seat and to be unseated upon an excessive pressure within the case, and a control means for the operating means including a pressure line supplying fluid pressure to the said mechanism to hold the valve element engaged on the seat below said excessive pressure and a pressure regulating valve in said line and a relief line from the said mechanism and a pressure release valve in said relief line, said case normally containing a given pressure therein, said regulating valve normally maintaining a pressure in the said mechanism higher than the pressure in the case, and said release valve relieving pressure from the said mechanism at a pressure higher than the pressure maintained by the regulating valve when excessive pressure occurs within the case.

5. In combination, a chest-like case having a closure, a valve in communication with the case and having a seat and a movable valve element engageable with the seat, an operating means for the movable valve element including a fluid operated reciprocating mechanism of lesser cross sectional area than that of the valve element to shift the valve element to engage on the seat and to be unseated upon an excessive pressure within the case, and a control means for the operating means including a pressure line supplying fluid pressure to the said mechanism to hold the valve element engaged on the seat below said excessive pressure and a pressure regulating valve in said line, said case normally containing a given pressure therein, and said regulating valve normally maintaining a differential pressure in the said mechanism higher than the pressure in the case to hold the valve element on the seat at a pressure in excess of the pressure within the case.

6. In combination, a chest-like case having a closure, a valve in communication with the case and having a seat and a movable valve element engageable with the seat, an operating means for the movable valve element including a fluid operated reciprocating mechanism of lesser cross sectional area than that of the valve element to shift the valve element to engage on the seat and to be unseated upon an excessive pressure within the case, and a control means for the operating means including a pressure line supplying fluid pressure to the said mechanism to hold the valve element engaged on the seat below said excessive pressure and a pressure regulating valve in said line and a relief line from said mechanism and a pressure release valve in said relief line, said case normally containing a given pressure therein, said regulating valve normally maintaining a differential pressure in the said mechanism higher than the pressure in the case to hold the valve element on the seat at a pressure in excess of the pressure within the case, and said release valve relieving pressure from the said mechanism at a pressure higher than the pressure maintained by the regulating valve when excessive pressure occurs within the case.

7. In combination, a chest-like case having a closure, a valve in communication with the case and having a seat and a movable valve element engageable with the seat, an operating means for the movable valve element including a reciprocating mechanism with a rod connected to the valve element to shift the valve element to engage on the seat and to be unseated upon an excessive pressure within the case, and a control means for the operating means including a pressure line supplying fluid pressure to said mechanism to hold the valve element engaged on the seat below said excessive pressure and an adjustable pressure regulating valve in said line maintaining said fluid pressure to hold the valve element engaged on the seat below said excessive pressure.

8. In combination, a chest-like case having a closure, a valve in communication with the case and having a seat and a movable valve element engageable with the seat, an operating means for the movable valve element including a reciprocating mechanism with a rod connected to the valve element to shift the valve element to engage on the seat and to be unseated upon an excessive pressure within the case, and a control means for the operating means including a pressure line supplying fluid pressure to said mechanism to hold the valve element engaged on the seat below said excessive pressure and an adjustable pressure regulating valve in said line and a relief line from the mechanism and a pressure release valve in said relief line, said case normally containing a given pressure therein, said regulating valve maintaining said fluid pressure to normally hold the valve element engaged on the seat below said excessive pressure, and said release valve relieving pressure from the said mechanism at a pressure higher than the pressure maintained by the regulating valve when excessive pressure occurs within the case.

References Cited in the file of this patent

UNITED STATES PATENTS

| 1,400,411 | Booth | Dec. 13, 1921 |
| 1,435,264 | Starker | Nov. 14, 1922 |
| 1,767,038 | Anderson | June 24, 1930 |
| 1,884,810 | Muller | Oct. 25, 1932 |
| 2,261,364 | Grove | Nov. 4, 1941 |
| 2,270,304 | Jacobsson | Jan. 20, 1942 |
| 2,659,235 | Storer | Nov. 17, 1953 |
| 2,679,860 | Diebold | June 1, 1954 |